US012335951B2

(12) United States Patent
Tanaka

(10) Patent No.: US 12,335,951 B2
(45) Date of Patent: Jun. 17, 2025

(54) WIRELESS BASE STATION AND WIRELESS TERMINAL

(71) Applicant: SONY GROUP CORPORATION, Tokyo (JP)

(72) Inventor: Ken Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 325 days.

(21) Appl. No.: 17/802,958

(22) PCT Filed: Dec. 2, 2020

(86) PCT No.: PCT/JP2020/044869
§ 371 (c)(1),
(2) Date: Aug. 28, 2022

(87) PCT Pub. No.: WO2021/176783
PCT Pub. Date: Sep. 10, 2021

(65) Prior Publication Data
US 2023/0098215 A1  Mar. 30, 2023

(30) Foreign Application Priority Data

Mar. 4, 2020  (JP) ................. 2020-036688

(51) Int. Cl.
*H04W 72/20* (2023.01)
(52) U.S. Cl.
CPC .................. *H04W 72/20* (2023.01)
(58) Field of Classification Search
CPC ..... H04B 7/024; H04L 5/0035; H04L 5/0048; H04L 25/0204; H04L 25/0222;
(Continued)

(56) References Cited

U.S. PATENT DOCUMENTS 8,879,484 B2  11/2014  Wan
2009/0074086 A1*  3/2009  Murakami .......... H04L 27/2628
375/260
(Continued)

FOREIGN PATENT DOCUMENTS

JP  2012-085237 A  4/2012
JP  2012-531858 A  12/2012
(Continued)

OTHER PUBLICATIONS

International Search Report and Written Opinion of PCT Application No. PCT/JP2020/044869, issued on Feb. 22, 2021, 09 pages of ISRWO.

*Primary Examiner* — Awet Haile
(74) *Attorney, Agent, or Firm* — CHIP LAW GROUP

(57) ABSTRACT

Phase tracking when joint transmission is performed by a plurality of wireless base stations is easily implemented. The wireless base stations perform coordinated transmission to transmit to the wireless terminal in coordination with a coordinated wireless base station. The wireless base station includes a wireless control unit and a communication unit. The wireless control unit makes an agreement on a reference signal with the coordinated wireless base station that performs coordinated transmission, and generates an agreed reference signal. The communication unit transmits a signal including the reference signal to the wireless terminal in coordination with the coordinated wireless base station. The wireless terminal estimates a frequency error among the wireless base stations that perform coordinated transmission on the basis of the received reference signal.

17 Claims, 10 Drawing Sheets

(58) Field of Classification Search
CPC ............... H04L 27/2613; H04L 5/0053; H04J 11/0053; H04J 11/0056; H04W 56/0035; H04W 72/02

See application file for complete search history.

(56) References Cited

U.S. PATENT DOCUMENTS

| | | | | |
|---|---|---|---|---|
| 2011/0292906 | A1* | 12/2011 | Ren | H04L 5/0035 370/329 |
| 2012/0099547 | A1* | 4/2012 | Wan | H04L 5/0035 370/329 |
| 2016/0028463 | A1* | 1/2016 | Wang | H04L 5/0023 370/329 |
| 2018/0115398 | A1* | 4/2018 | Su | H04L 5/0035 |
| 2019/0273534 | A1 | 9/2019 | Wang | |
| 2020/0322953 | A1* | 10/2020 | Hunukumbure | H04L 5/0048 |
| 2022/0014250 | A1* | 1/2022 | Sun | H04B 7/0478 |

FOREIGN PATENT DOCUMENTS

| | | |
|---|---|---|
| JP | 2015-126412 A | 7/2015 |
| JP | 2016-501465 A | 1/2016 |
| JP | 2016-515777 A | 5/2016 |
| WO | 2010/079985 A2 | 7/2010 |

\* cited by examiner

WIRELESS BASE STATION AND WIRELESS TERMINAL

CROSS REFERENCE TO RELATED APPLICATIONS

This application is a U.S. National Phase of International Patent Application No. PCT/JP2020/044869 filed on Dec. 2, 2020, which claims priority benefit of Japanese Patent Application No. JP 2020-036688 filed in the Japan Patent Office on Mar. 4, 2020. Each of the above-referenced applications is hereby incorporated herein by reference in its entirety.

TECHNICAL FIELD

The present technology relates to a wireless base station and a wireless terminal. Specifically, the present invention relates to a wireless base station and a wireless terminal in a wireless system including a plurality of wireless base stations that performs joint transmission.

BACKGROUND ART

In a wireless LAN, an access point (AP or BS) and a terminal (STA or UE) autonomously obtain a transmission right in one basic service set (BSS) to perform communication in the BSS. In a case where a plurality of antennas is mounted on the transmission terminal, transmission can be performed with a high gain to a desired destination terminal by transmission (beamforming (BF)) using the plurality of antennas simultaneously, and a system throughput in the BSS can be improved. In general, the gain obtained by beamforming is proportional to the number of antennas used at the same time. This beamforming can be extended to improve a system throughput by transmission by a plurality of AP (hereinafter, referred to as a multi AP) in coordination with each other.

There is a plurality of methods for the multi AP, and there exist coherent joint transmission (CJT) that transmits as a virtual single AP having an antenna corresponding to the sum of antennas of each other, non-coherent joint transmission (NCJT) that forms a beam independently by each AP and transmits the beam to a common reception terminal, and coordinated nulling that forms a null so as not to interfere with each other's communication terminals when forming a beam independently by each AP and communicating with a different terminal. These can achieve a higher system throughput in an environment where a plurality of AP exists than in a case where a plurality of AP is not in coordination with each other. Among them, the CJT that transmits as the virtual single access point having an antenna corresponding to the sum of antennas of each other can achieve the highest throughput in the multi AP. On the other hand, the CJT needs to synchronize carrier frequencies among access points with high accuracy in order to operate as one virtual access point among the multi AP. Furthermore, it is necessary to perform frequency synchronization between the multi AP and terminals. However, in an actual system, it is difficult to completely synchronize the carrier frequencies with each other, and a frequency residual error, that is, a residual carrier frequency offset (CFO) occurs.

In an orthogonal frequency division multiplexing (OFDM) modulation method, which is a modulation method widely used in wireless communication systems, it is possible to insert a different data sequence for each subcarrier, but a known sequence (hereinafter, a pilot signal) is inserted into a specific subcarrier in each OFDM symbol. The sequence inserted into each subcarrier by the residual CFO causes common complex phase rotation over time, but the terminal performs compensation (phase tracking) to cancel the phase rotation of the pilot signal. In the CJT, since the residual CFO of each access point constituting the multi AP for the terminal is different, it is necessary to estimate the residual CFO of each access point and perform phase tracking. However, when the pilot signal is inserted into the same subcarrier among the multi AP, pilot signals having different residual CFO are multiplexed, which causes a problem that it is difficult to accurately perform the phase tracking. Therefore, for example, a system for allocating the pilot signal so as to separate the pilot signal using a pseudo-orthogonal sequence unique to each base station has been proposed (see, for example, Patent Document 1).

CITATION LIST

Patent Document

Patent Document 1: WO 2010/079985

SUMMARY OF THE INVENTION

Problems to be Solved by the Invention

In the above-described conventional technique, the pilot signal is separated using the pseudo-orthogonal sequence unique to each base station. However, due to the nature of the pseudo-orthogonal sequence, it is difficult for the terminal to estimate the residual CFO for every access point, and there is a problem that it is difficult to perform the phase tracking in the CJT.

The present technology has been made in view of such a situation, and an object thereof is to easily implement phase tracking when joint transmission is performed by a plurality of wireless base stations.

Solutions to Problems

The present technology has been made to solve the above-described problems, and a first aspect thereof is a wireless base station including a wireless control unit that generates a reference signal agreed with a coordinated wireless base station that performs coordinated transmission, and a communication unit that transmits a signal including the reference signal to a wireless terminal in coordination with the coordinated wireless base station. This brings about an effect of transmitting a signal including the reference signal agreed with the coordinated wireless base station (for example, a slave access point) to the wireless terminal in coordination with the coordinated wireless base station.

Furthermore, in the first aspect, the reference signal may be transmitted using at least one of a different frequency, a different time, or a different sequence. This brings about an effect of securing orthogonality of the reference signal and facilitating separation on the reception side.

Furthermore, in the first aspect, the communication unit may exchange information regarding a coordination method that is applicable prior to the coordinated transmission between the coordinated wireless base station and the wireless terminal. This brings about an effect of confirming the coordination method that is applicable prior to the coordinated transmission.

Furthermore, in the first aspect, the wireless control unit may agree on allocation of the reference signal in the coordinated transmission with the coordinated wireless base station prior to the generation of the reference signal. This brings about an effect that the allocation of the reference signal in the coordinated transmission is determined prior to the generation of the reference signals.

Further, in the first aspect, the wireless control unit may agree on information of every frequency channel in a frequency band used in the coordination method and information regarding the frequency channel. Furthermore, the wireless control unit may agree on at least one of information regarding a number of the coordinated wireless base stations, information for identifying the coordinated wireless base stations, or information including a number allocated to the coordinated wireless base stations. Further, for each of the coordinated wireless base stations, the wireless control unit may agree on information indicating presence or absence of insertion of the reference signal, information indicating a symbol into which the reference signal is inserted, and information including at least one of a sequence for separating the reference signal by the reception terminal.

Furthermore, in the first aspect, the communication unit may transmit information regarding the coordinated wireless base station to the wireless terminal in the coordinated transmission. This brings about an effect of notifying the wireless terminal of the information regarding the coordinated wireless base station in the coordinated transmission.

Furthermore, in the first aspect, the communication unit may transmit information of every arbitrary frequency channel used in the coordinated transmission to the wireless terminal as the information regarding the coordinated wireless base station. Further, the communication unit may transmit an identification number to be allocated to the coordinated wireless base station to the wireless terminal as the information regarding the coordinated wireless base station. Furthermore, the information regarding the coordinated wireless base station may be information for determining allocation of the reference signal by combining with a codebook determined with the coordinated wireless base station.

Furthermore, in the first aspect, a signal processing unit that compensates for a frequency error on the basis of information regarding frequency synchronization notified from the wireless terminal in the coordinated transmission may be further included. This brings about an effect that the frequency error is compensated on the basis of the information regarding the frequency synchronization notified from the wireless terminal.

Furthermore, a second aspect of the present technology is a wireless base station including a wireless control unit that receives reference information from a coordinated wireless base station that performs coordinated transmission, and a communication unit that transmits a signal including the reference information to the wireless terminal in coordination with the coordinated wireless base station. This brings about an effect of transmitting a signal including the reference information received from the coordinated wireless base station (for example, a master access point) to the wireless terminal in coordination with the coordinated wireless base station.

Furthermore, in the second aspect, the communication unit may transmit information regarding the coordinated wireless base station to the wireless terminal in the coordinated transmission. This brings about an effect of notifying the wireless terminal of the information regarding the coordinated wireless base station in the coordinated transmission.

Furthermore, in the second aspect, the communication unit may transmit information of every arbitrary frequency channel used in the coordinated transmission to the wireless terminal as the information regarding the coordinated wireless base station. Further, the communication unit may transmit an identification number to be allocated to the coordinated wireless base station to the wireless terminal as the information regarding the coordinated wireless base station. Furthermore, the information regarding the coordinated wireless base station may be information for determining allocation of the reference signal by combining with a codebook determined with the coordinated wireless base station.

Furthermore, in the second aspect, a signal processing unit that compensates for a frequency error on the basis of information regarding frequency synchronization notified from the wireless terminal in the coordinated transmission may be further included. This brings about an effect that the frequency error is compensated on the basis of the information regarding the frequency synchronization notified from the wireless terminal.

Furthermore, a third aspect of the present technology is a wireless terminal including a channel estimation unit that separates a reference signal from signals transmitted in coordination from a plurality of wireless base stations on the basis of reference information and estimates a frequency error among the plurality of wireless base stations, and a signal processing unit that performs phase shift compensation on the signals transmitted in coordination on the basis of the estimated frequency error. This brings about an effect of estimating the frequency error from the signals transmitted in coordination and performing the phase shift compensation.

Furthermore, in the third aspect, the channel estimation unit may separate the reference signal on the basis of a codebook determined among the plurality of wireless base stations and the information. This brings about an effect of further separating the reference signal on the basis of the codebook.

Furthermore, in the third aspect, a communication unit that transmits information regarding the estimated frequency error to at least one of the plurality of wireless base stations may be further included. This brings about an effect of notifying the wireless base station of the information regarding the estimated frequency error.

MODE FOR CARRYING OUT THE INVENTION

Hereinafter, modes for carrying out the present technology (hereinafter referred to as embodiments) will be described. The description will be given in the following order.

1. Embodiment
2. Modification Examples

1. Embodiment

[Wireless Network System]

Figure 1:
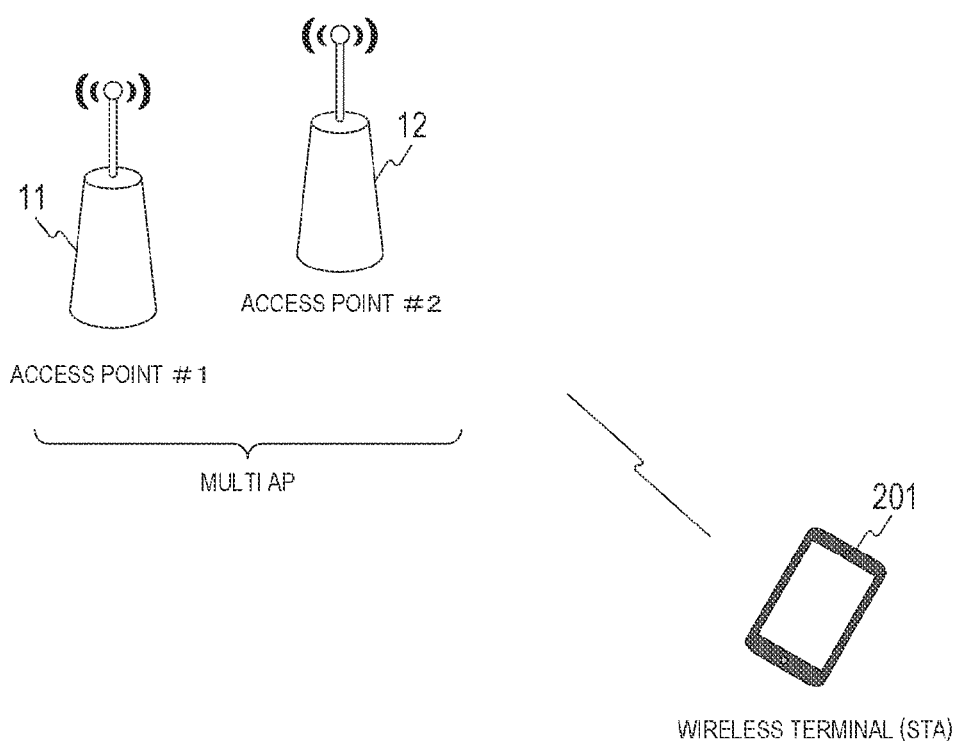
FIG. 1 is a diagram illustrating a configuration example of a wireless network system in an embodiment of the present technology.

FIG. 1 is a diagram illustrating a configuration example of a wireless network system in an embodiment of the present technology.

Here, it is assumed that a plurality of access points 11 and 12 perform joint transmission (JT) in coordination with each other. The access points 11 and 12 that perform the joint transmission are collectively referred to as a multi AP. The number of access points constituting the multi AP may be three or more. Furthermore, in this example, a wireless terminal 201 is illustrated as a transmission destination of the joint transmission, but communication with a plurality of wireless terminals is also possible at the same time.

In order to determine a coordination method of the multi AP, a determination main body of the coordination method of the multi AP is defined as a master AP, and an access point that implements the coordination method upon notification from the master AP is defined as a slave AP. Note that the master AP may be referred to as a sharing AP, and the slave AP may be referred to as a shared AP. The master AP may engage in a multi AP coordination method. For example, in the drawing, the access point 11 may be the master AP, and the access point 12 may be the slave AP. Hereinafter, the access point 11 is referred to as a master AP 101 and the access point 12 is referred to as a slave AP 102, but the slave AP may be a plurality of access points. Note that the master AP and the slave AP are not fixedly determined in the AP, and may be dynamically determined in the multi AP. For example, the AP 1 may be the master AP and the AP 2 may be the slave AP at a certain time t1, and the AP 1 may be the slave AP and the AP 2 may be the master AP at a different time t2.

[Device Configuration]

Figure 2:
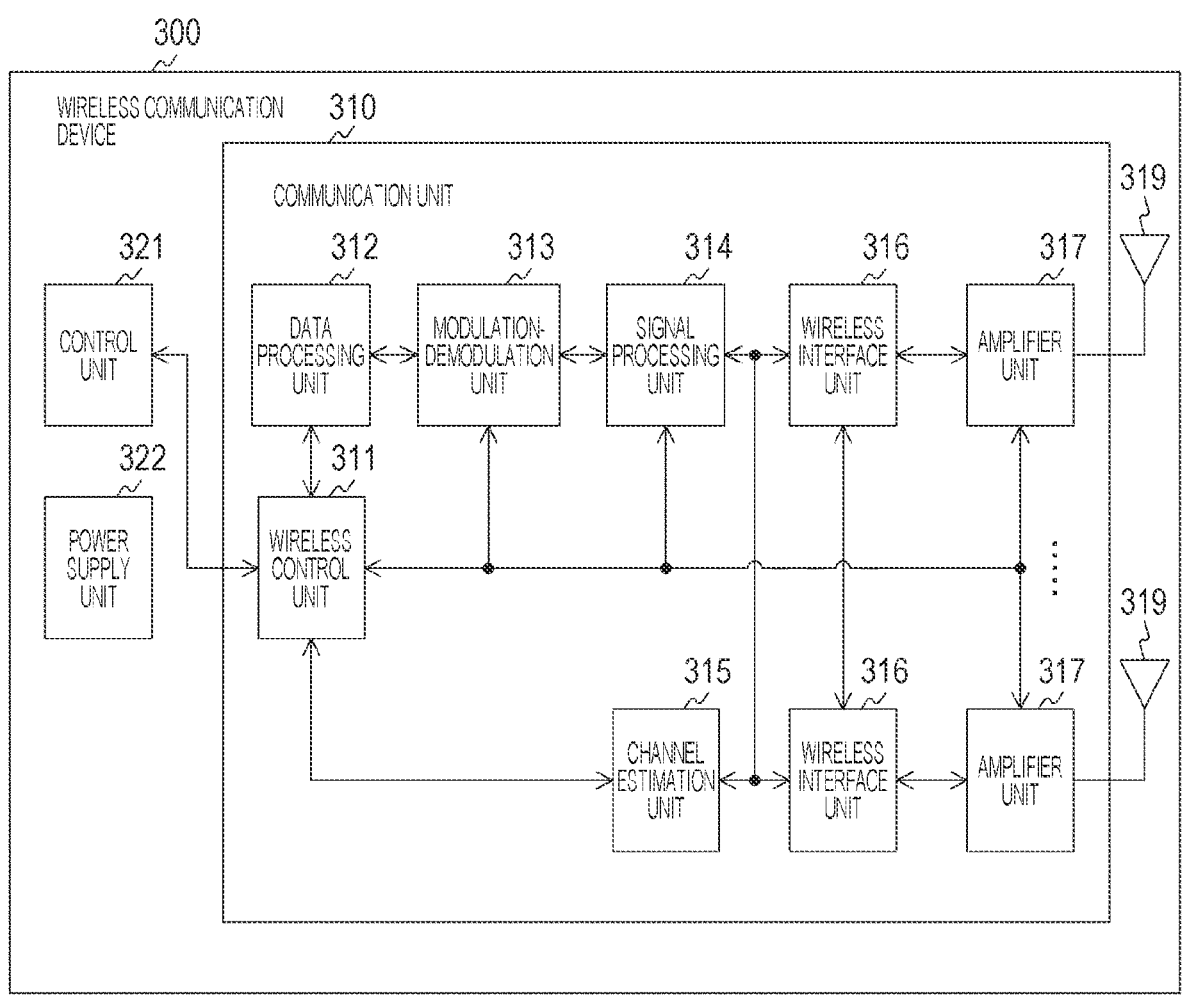
FIG. 2 is a diagram illustrating a configuration example of a wireless communication device 300 in the embodiment of the present technology.

FIG. 2 is a diagram illustrating a configuration example of a wireless communication device 300 in the embodiment of the present technology. The wireless communication device 300 described herein includes the master AP 101, the slave AP 102, and the wireless terminal 201. Furthermore, for example, the wireless communication device 300 may be a wireless communication module or an integrated circuit mounted on the AP or the terminal.

The wireless communication device 300 includes a communication unit 310, a control unit 321, a power supply unit 322, and an antenna 319. There may be a plurality of communication units 310.

The communication unit 310 includes a wireless control unit 311, a data processing unit 312, a modulation-demodulation unit 313, a signal processing unit 314, a channel estimation unit 315, a wireless interface unit 316, and an amplifier unit 317. The wireless interface unit 316, the amplifier unit 317, and the antenna 319 may form one set, and one or more sets may be components. Furthermore, the function of the amplifier unit 317 may be included in the wireless interface unit 316. The communication unit 310 is implemented by, for example, a large scale integration (LSI).

At the time of transmission by which data is input from an upper layer, the data processing unit 312 generates a packet for wireless transmission from the data, performs processing such as addition of a header for media access control (MAC) or addition of an error detection code, and supplies processed data to the modulation-demodulation unit 313. On the other hand, at the time of reception when there is an input from the modulation-demodulation unit 313, MAC header analysis, packet error detection, reorder processing, and the like are performed, and processed data is provided to its own protocol upper layer.

The wireless control unit 311 exchanges information between the units. Further, parameter setting in the modulation-demodulation unit 313 and the signal processing unit 314, packet scheduling in the data processing unit 312, parameter setting and transmission power control of the modulation-demodulation unit 313, the signal processing unit 314, the wireless interface unit 316, and the amplifier unit 317 are performed.

At the time of transmission, the modulation-demodulation unit 313 generates a data symbol stream for input data from the data processing unit 312 on the basis of a parameter related to a physical layer (PHY) set by the wireless control unit 311, and supplies the data symbol stream to the signal processing unit 314. Specifically, the wireless control unit 311 performs encoding, interleaving, and modulation on the basis of an encoding method and a modulation method, generates a data symbol stream, and supplies the data symbol stream to the signal processing unit 314. At the time of reception, reverse processing to that at the time of transmission is performed on the input from the signal processing unit 314, and data is supplied to the data processing unit 312 or the wireless control unit 311.

At the time of transmission, the signal processing unit 314 performs signal processing provided for spatial separation on the input from the modulation-demodulation unit 313 as necessary, and supplies one or more transmission symbol streams obtained to each wireless interface unit 316. In addition, a preamble of the physical layer is added or the pilot signal is inserted on the basis of a parameter related to the physical layer set by the wireless control unit 311. Note that a pilot signal may be generated as necessary. Furthermore, at the time of reception, the signal processing unit 314 performs signal processing on the received symbol stream input from the each wireless interface unit 316, performs phase tracking with reference to the received pilot signal as necessary and spatial decomposition of the stream, and supplies it to the modulation-demodulation unit 313.

The channel estimation unit 315 estimates a frequency error between the own terminal and the received signal and calculates complex channel gain information of a propagation path from a preamble portion and a training signal portion of an input signal from each wireless interface unit 316. The estimated frequency error and the calculated complex channel gain information are used for demodulation processing in the modulation-demodulation unit 313 and signal processing in the signal processing unit 314 via the wireless control unit 311.

At the time of transmission, the wireless interface unit 316 converts an input from the signal processing unit 314 into an analog signal, performs filtering, up-conversion to a carrier frequency, and phase control, and transmits the analog signal to the antenna 319 or the amplifier unit 317. At the time of reception, reverse processing is performed on the input from the antenna 319 or the amplifier unit 317, and data is supplied to the signal processing unit 314 and the channel estimation unit 315.

At the time of transmission, the amplifier unit 317 amplifies the analog signal input from the wireless interface unit 316 to predetermined power and transmits the amplified analog signal to the antenna 319. At the time of reception, a signal input from the antenna 319 is amplified to predetermined power and output to the wireless interface unit 316. In the amplifier unit 317, all or a part of at least one of the function at the time of transmission or the function at the time of reception may be included in the wireless interface unit 316. Furthermore, in the amplifier unit 317, all or a part of at least one of the function at the time of transmission or the function at the time of reception may be a component outside the communication unit 310.

The control unit 321 controls the wireless control unit 311 and the power supply unit 322. Furthermore, the control unit 321 may perform at least a part of the operation of the wireless control unit 311 instead of the wireless control unit 311.

The power supply unit 322 includes a battery power supply or a fixed power supply, and supplies power to each unit of the wireless communication device 300.

Among these configurations, the wireless control unit 311 and the control unit 321 control each unit to perform the following operations.

[Operation]

Figure 3:
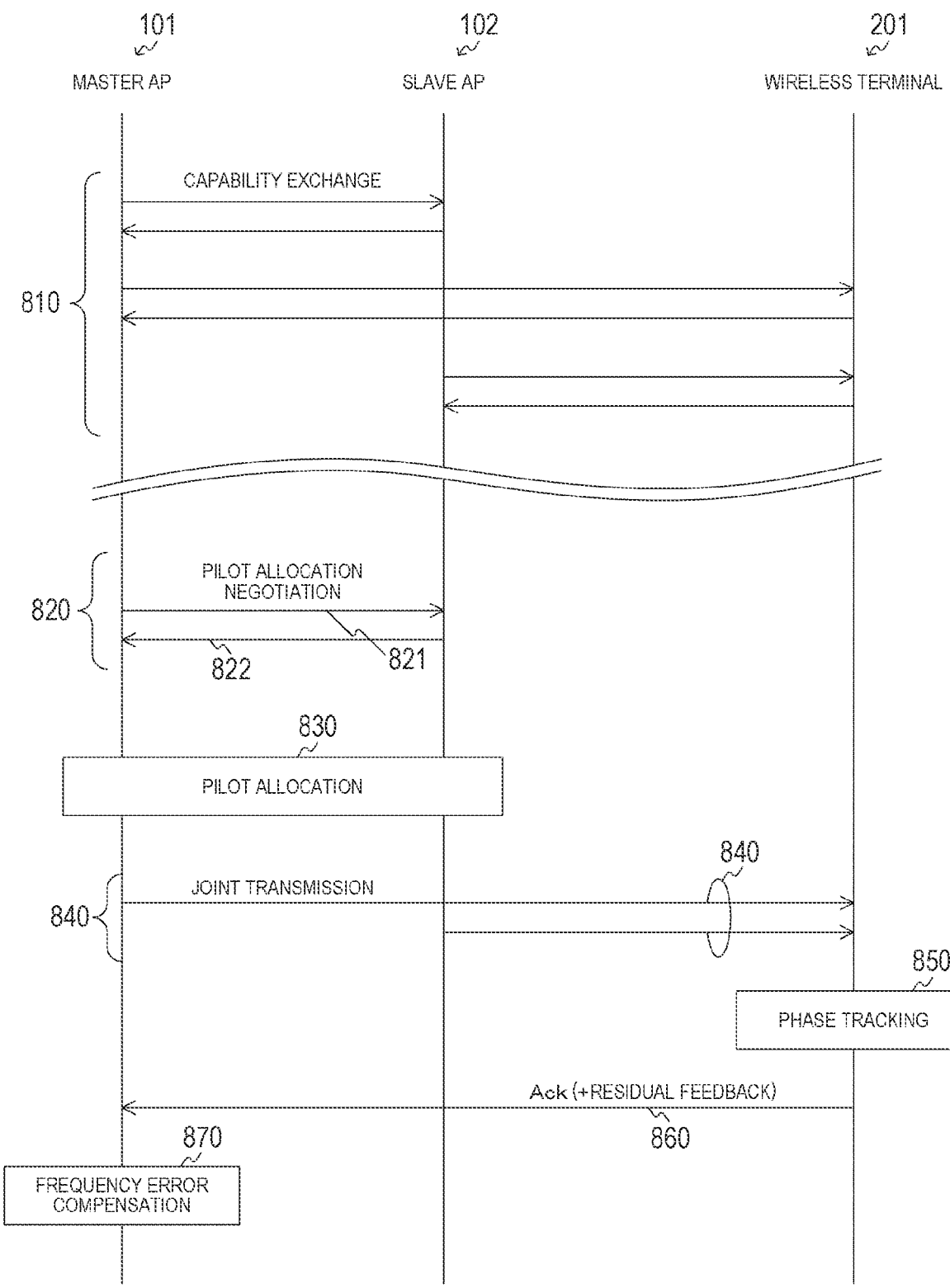
FIG. 3 is a sequence diagram illustrating an operating example of the wireless network system in the embodiment of the present technology.

FIG. 3 is a sequence diagram illustrating an operation example of the wireless network system in the embodiment of the present technology.

Here, it is assumed that the wireless terminal 201 is present and the master AP 101 and the slave AP 102 capable of performing joint transmission to the wireless terminal 201 are present as the multi AP.

[Capability Exchange]

First, the master AP 101, the slave AP 102, and the wireless terminal 201 notify each other whether joint transmission by the multi AP can be performed. This is referred to as a capability exchange 810.

Specifically, it is notified that the master AP 101 and the slave AP 102 can perform transmission by joint transmission, and the wireless terminal 201 can receive signals transmitted by joint transmission. Note that a notification of information indicating whether or not transmission and reception are possible may be given to a coherent joint transmission (CJT) or a non-coherent joint transmission (NCJT) in joint transmission.

Furthermore, enabling joint transmission may be interpreted as enabling execution of frequency synchronization with accuracy required for indirect joint transmission. For example, it may be interpreted that high-accuracy frequency synchronization cannot be implemented in a case where only the NCJT is implementable, but high-accuracy frequency synchronization can be implemented in a case where the CJT is implementable.

Note that the capability exchange 810 is an example of a communication unit described in the claims.

[Pilot Allocation Negotiation]

After the capability exchange 810 notifies that transmission by joint transmission is possible between the multi AP and the wireless terminal 201, the master AP 101 that has determined to perform the joint transmission by the multi AP notifies (821) the slave AP 102 of information for determining allocation of the pilot signal. The slave AP 102 that has received the notification 821 from the master AP 101 notifies (822) the master AP 101 of the information for determining the allocation of the pilot signal. This exchange for agreement is referred to as pilot allocation negotiation (Pilot Allocation Negotiation) 820.

For example, the master AP 101 may notify (821) of information indicating the allocation of the pilot signal in joint transmission, and the slave AP 102 may be notified (822) of information indicating approval. Furthermore, the master AP 101 may similarly notify (821) of information indicating a plurality of candidates, and the slave AP 102 may return (822) a candidate selected from the candidates.

The pilot allocation negotiation 820 may be performed before joint transmission every time the multi AP performs the joint transmission, but may not necessarily be performed every time the multi AP performs the joint transmission. For example, in a case where the allocation method of the pilot signal used in a case of being allocated as the master AP 101 and the slave AP 102 is common among the multi AP, the allocation of the pilot signal may be implicitly determined at the same time as allocation of the access points constituting the multi AP as the master AP 101 and the slave AP 102. In this case, it may be determined to follow this allocation method as long as the allocation of the master AP 101 and the slave AP 102 is not changed.

Note that the pilot allocation negotiation 820 is an example of a wireless control unit described in the claims.

After the pilot allocation negotiation 820 is performed, each access point constituting the multi AP performs the allocation of the pilot signal (830) determined by the pilot allocation negotiation 820 when performing joint transmission.

Note that the pilot allocation 830 is an example of a wireless control unit described in the claims.

[Joint Transmission]

The multi AP for which the pilot allocation in joint transmission is determined by the pilot allocation negotiation 820 allocates the pilot signal according to the determined allocation of the pilot signal and performs the joint transmission (for example, a CJT) (840) to the wireless terminal 201.

Note that, prior to the joint transmission, data to be transmitted to the wireless terminal 201 may be shared among the multi AP, or frequency synchronization between the multi AP may be performed.

Note that the joint transmission 840 is an example of a communication unit described in the claims.

[Phase Tracking]

The wireless terminal 201 that has received the signal by the joint transmission from the multi AP performs frequency synchronization with the multi AP and performs phase tracking 850 on the basis of the allocated pilot signal. At that time, a codebook determined among the multi AP may be referred to.

There are various methods of implementation of the phase tracking. For example, a simple algorithm that can be applied to the pilot allocation specified in IEEE 802.11 with the amount of complex phase rotation of the pilot signal being minute has been proposed (A. Troya, M. Krstic, and K. Maharatna, "Simplified residual phase correction mechanism for the IEEE 802.11a standard," in Proc. IEEE VTC-Fall, October 2003, vol. 2, pp. 1137-1141). The algorithm presented here is a phase tracking algorithm for one transmitter, but this can also be applied to the multi AP. At that time, if the frequencies are not completely synchronized between the access points constituting the multi AP, the phase tracking may be performed for one access point. Alternatively, the phase tracking may be performed on an average frequency among a plurality of access points. Thus, the influence of the residual frequency error on the multi AP can be reduced.

Note that the phase tracking 850 is an example of a channel estimation unit and a signal processing unit described in the claims.

[Ack]

The wireless terminal 201 that has determined that the reception of the signal by the joint transmission from the multi AP has been completed notifies the multi AP of information acknowledgement (Ack) 860 indicating that the signal has been normally received. At this time, the wireless terminal 201 can estimate the residual CFO between the master AP 101 and the slave AP 102 by the pilot signal, and may notify of the Ack 860 together with information indicating the residual CFO (Residual CFO Feedback).

Note that the Ack 860 is an example of a communication unit described in the claims.

Upon receiving the Ack 860, the master AP 101 may compensate (870) for the frequency error so as to reduce the residual CFO among the multi AP on the basis of the notified information indicating the residual CFO.

Note that the frequency error compensation 870 is an example of a signal processing unit described in the claims.

[Frame Configuration]

Hereinafter, a configuration of each frame and the like described in the above-described sequence diagram will be described in detail.

[Capability Exchange]

Figure 4:
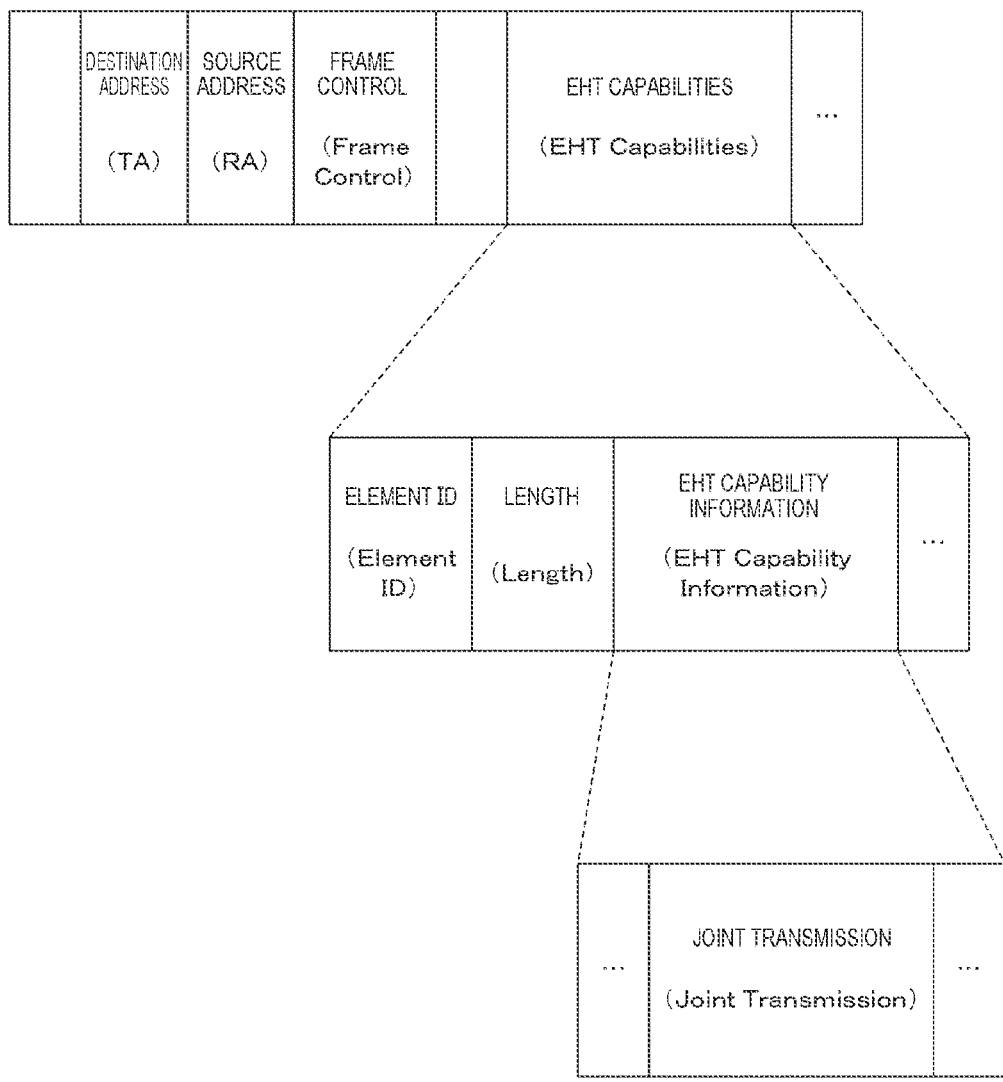
FIG. 4 is a diagram illustrating a configuration example of a frame to be notified in capability exchange 810 in the embodiment of the present technology.

FIG. 4 is a diagram illustrating a configuration example of a frame to be notified in the capability exchange 810 in the embodiment of the present technology.

A notification frame of the capability exchange 810 is used to notify whether or not the wireless terminal 201 that has transmitted the notification frame can perform the joint transmission. This frame includes, but is not limited to, a "destination address", a "source address", a "frame control", and an "extremely high throughput (EHT) capability". Note that, regarding the "destination address", the "source address", and the "frame control", similar information is to be notified also in frames and the like illustrated in the subsequent drawings, and thus the description of the subsequent frames and the like is omitted.

The "destination address" (TA) includes information indicating a terminal to be a destination of this frame. For example, information indicating the MAC address of the destination terminal may be included, but in a case where a plurality of specific terminals or all terminals capable of receiving the frame is set as the destination terminal, information indicating that the frame may be received by those terminals may be included. The "source address" (RA) includes information indicating a terminal that is the source of this frame. Similarly to the "destination address", information indicating a MAC address of the source may be included.

The "frame control" includes information indicating that this frame is a frame to be notified in the capability exchange 810. However, the frame is not necessarily included only in the "frame control", and may be configured to indicate that this frame is a frame to be notified as the capability exchange 810 by being combined with other information in this frame.

The "EHT capabilities" includes information indicating the capability of the wireless communication device that transmits the frame, and particularly includes information indicating whether the joint transmission can be performed. The "EHT capability" includes at least one of an "element ID", "length", or "EHT capability information", but the components are not limited thereto.

The "element ID" includes information indicating that this element is the "EHT capability". The "length" includes information indicating a length of information stored as the "EHT capability". The "EHT capability information" includes information indicating the capability of the terminal that transmits the frame. The "EHT capability information" includes "joint transmission" information, but the components are not limited thereto.

The "joint transmission" of the "EHT capability information" includes information indicating whether or not the joint transmission is possible. Furthermore, the "joint transmission" may include information indicating implementation or non-implementation of some methods in detail. For example, in a case where the "joint transmission" is represented by three bits, it may be configured that "000" indicates that the joint transmission cannot be performed regardless of the method, "010" indicates that only reception of NCJT can be performed in the joint transmission, "011" indicates that transmission and reception of NCJT can be performed in the joint transmission, "100" indicates that only transmission can be performed regardless of CJT or NCJT, and "101" indicates that both transmission and reception can be performed regardless of CJT or NCJT.

[Pilot Allocation Negotiation]

Figure 5:
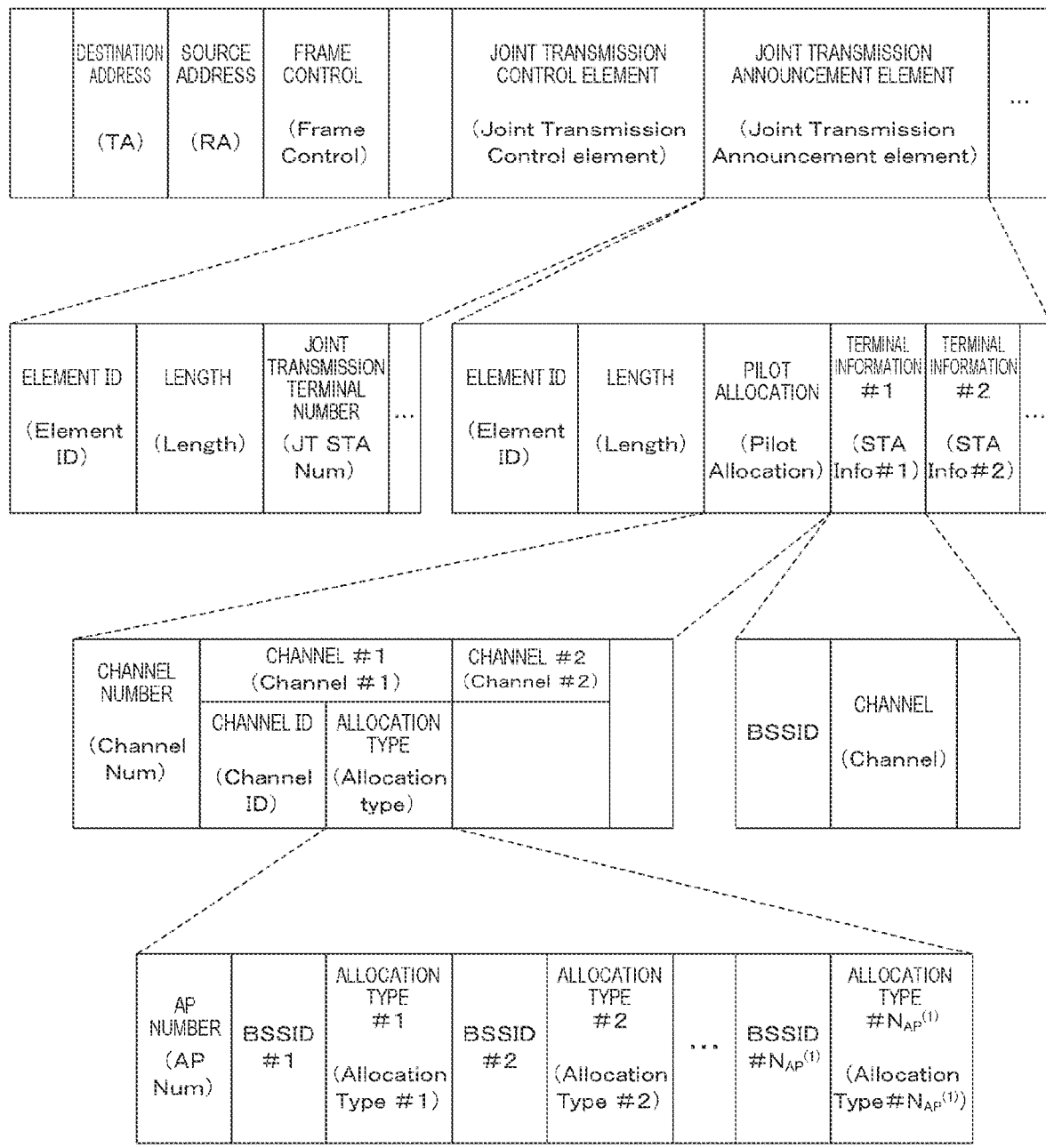
FIG. 5 is a diagram illustrating a configuration example of a frame to be notified in pilot allocation negotiation 820 in the embodiment of the present technology.

FIG. 5 is a diagram illustrating a configuration example of a frame to be notified in the pilot allocation negotiation 820 in the embodiment of the present technology.

The frame to be notified in the pilot allocation negotiation 820 is used to notify information for determining allocation of the pilot signal in the joint transmission among the multi AP capable of performing the joint transmission. The frame includes a "destination address", a "source address", a "frame control", a "joint transmission control element", and a "joint transmission announcement element", but the components are not limited thereto.

The "joint transmission control element" is used to estimate a length of a subsequent "joint transmission announcement element", but the application is not limited thereto. Note that the "joint transmission control element" may be defined as one element combined with the "joint transmission announcement element". The "joint transmission control element" includes at least one of an "element ID", a "length", or the "joint transmission terminal number", but the components are not limited thereto.

The "element ID" includes information indicating that this element is the "joint transmission control element". The "length" includes information indicating a length of this element. The "number of joint transmission terminals" (JT STA Num) includes information indicating the number of "terminal information" fields in the subsequent "joint transmission announcement element".

The "joint transmission announcement element" includes information indicating a frequency band used for transmission to the wireless terminal 201 to be a destination in joint transmission in addition to notifying of the allocation of the pilot signal in the joint transmission. The "joint transmission announcement element" includes at least one of an "element ID", a "length", "pilot allocation", or "terminal information", but the components are not limited thereto.

The "element ID" includes information indicating that this element is the "joint transmission announcement element". The "length" includes information indicating a length of this element. The "pilot allocation" includes information indicating the allocation of the pilot signal for each access point constituting the multi AP. The "terminal information" (STA Info) includes information indicating a frequency band allocated to the wireless terminal 201 to be a destination of the joint transmission.

The "pilot allocation" includes at least one of subfields of the "channel number" and "channel". The "channel number" (Channel Num) includes information indicating the number of subsequent "channel" subfields. The "channel" includes information indicating the allocation of the pilot signal to an arbitrary access point constituting the multi AP in the frequency band indicated by each channel.

Furthermore, information of a "channel ID" and an "allocation type" is stored in each "channel". The "channel ID" includes information indicating a target frequency band indicated by the "channel" subfield. The "allocation type" includes information indicating the allocation of the pilot signal to an arbitrary access point constituting the multi AP in the frequency band indicated by the "channel ID".

The "allocation type" includes information of "AP number", "BSSID #i", and "allocation type #i". The "AP number" (AP Num) includes information indicating the number of access points mentioned in the "allocation type". The "BSSID #i" includes information individually indicating access points different from each other. The "allocation type #i" includes information indicating the allocation of the pilot signal of the access point corresponding to each BSSID. Here, i is an integer from 1 to $N_{AP}^{(1)}$. For example, the "AP number" may include information indicating $N_{AP}^{(1)}$, and the "BSSID #i" may include information determined by MAC addresses of respectively designated access points.

Any one of the following pieces of information indicating the allocation may be commonly included in the "allocation type #i". Specifically, in the frequency band indicated by "channel ID", the access point indicated by "BSSID #i" is (1) information indicating whether or not to insert the pilot signal, (2) information indicating which OFDM symbol the pilot signal is to be inserted into, and (3) information indicating an orthogonal sequence for separating the pilot signal in the wireless terminal 201 in a case where the pilot signal is inserted across a plurality of subcarriers and OFDM symbols.

In this case, the phase tracking can be easily performed in the wireless terminal 201 by allocating the pilot signal such that orthogonality of the pilot signal is maintained for each access point. The orthogonality mentioned herein refers to use at least one of a different frequency, a different time, or a different sequence.

The "terminal information" includes at least one subfield of the "BSSID" and the "channel". The "BSSID" includes information indicating wireless terminals different from each other. The "channel" includes information indicating a frequency band allocated to the wireless terminal indicated by the "BSSID" at the time of the joint transmission.

[Joint Transmission]

Figure 6:
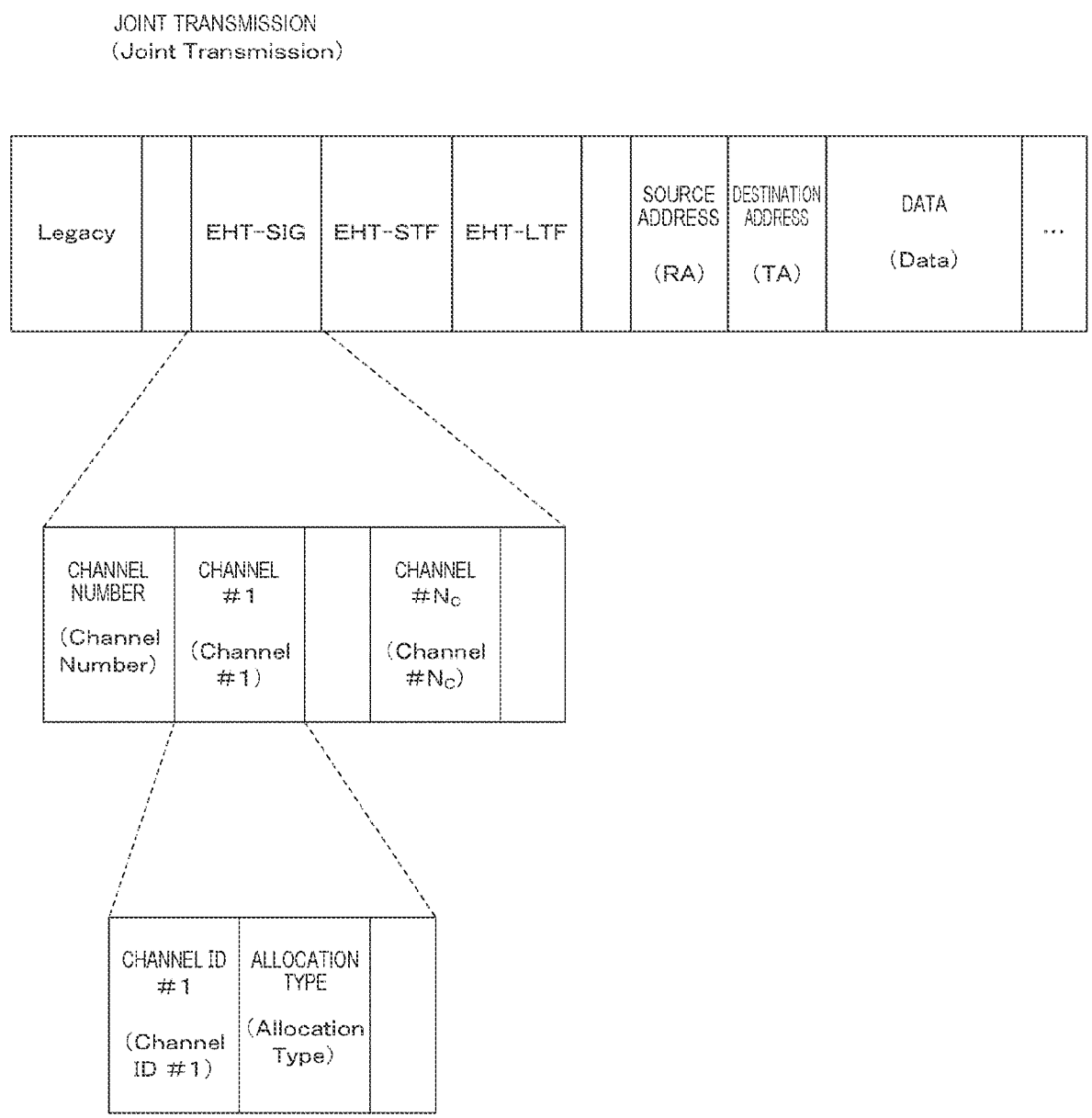
FIG. 6 is a diagram illustrating a configuration example of a data unit notified in joint transmission 840 in the embodiment of the present technology.

FIG. 6 is a diagram illustrating a configuration example of a data unit (physical-layer-convergence-protocol data unit (PPDU)) notified in the joint transmission 840 in the embodiment of the present technology.

The data unit notified in the joint transmission 840 is used when the multi AP in which the allocation of the pilot signal among the multi AP is determined by the pilot allocation negotiation 820 transmits data to the wireless terminal 201. This data unit includes the "legacy", "EHT-SIG", "EHT-STF", "EHT-LTF", the "source address", the "destination address" and "data", but the components are not limited thereto.

The "legacy" includes a sequence for performing frame detection, auto gain control (AGC), frequency synchronization, time synchronization, and propagation path estimation in order for the wireless terminal 201 that has received this frame to demodulate subsequent fields. The "EHT-SIG" includes information regarding a pilot signal allocated among the multi AP. In addition to the "legacy", the "EHT-STF" and "EHT-LTF" further include a sequence necessary for improving accuracy of the AGC, the frequency synchronization, the time synchronization, and the propagation path estimation. The "source address" includes information indicating the multi AP as a source. The "destination address" includes information indicating the wireless terminal 201 as a destination. The "data" includes data transmitted from the multi AP to the wireless terminal 201.

Here, the "legacy" may include a plurality of fields instead of one field. For example, it may be formed by dividing into a field for performing the frame detection, the AGC, and the time synchronization with coarse accuracy and a field for performing the frequency synchronization and the time synchronization with fine accuracy. Furthermore, the "EHT-SIG" may include information of a bandwidth to be used subsequently in addition to the information regarding the pilot signal described above, but the components are not limited thereto.

Furthermore, the "EHT-SIG" includes one or more subfields of the "channel number" and the "channel #i", but the components are not limited thereto. The "channel number" includes information indicating the number of subsequent "channel #i" subfields ($N_c$). That is, i in "channel #i" is an integer from 1 to $N_c$. The "channel #i" includes information indicating allocation of the pilot signal of the multi AP in the frequency band indicated by the "channel ID" in the "channel #i" subfield.

The "channel #i" subfield includes one or more subfields of the "channel ID" and the "allocation type", but components are not limited thereto. The "channel ID" includes information indicating a channel mentioned in the subsequent "allocation type". The "allocation type" includes information regarding the allocation of the pilot signal of the multi AP in the frequency band indicated by the "channel ID".

As described above, in the joint transmission 840 according to this embodiment, the transmission is performed together with the information indicating the allocation of the pilot signal of the multi AP.

[Ack]

Figure 7:
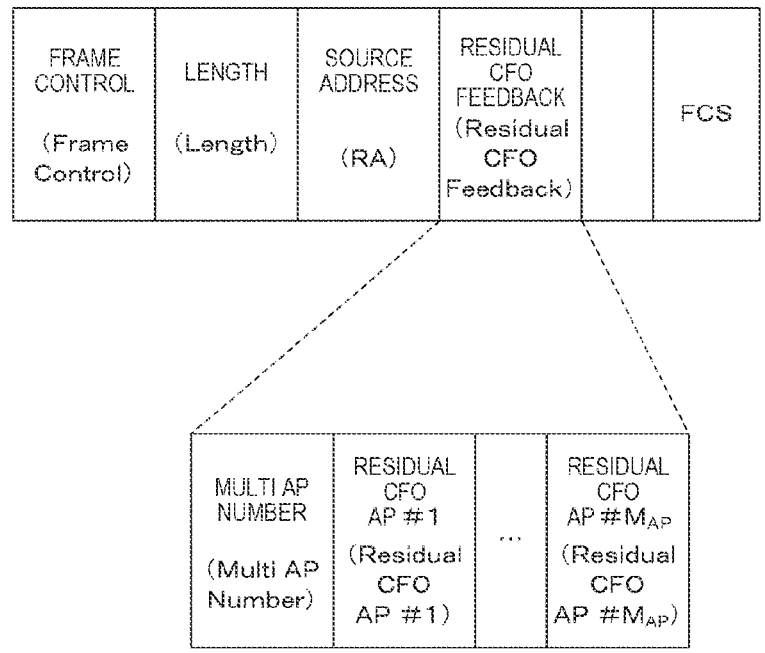
FIG. 7 is a diagram illustrating a configuration example of a frame to be notified by Ack 860 in the embodiment of the present technology.

FIG. 7 is a diagram illustrating a configuration example of a frame to be notified by the Ack 860 in the embodiment of the present technology.

The Ack 860 is used by the wireless terminal 201 that has received the frame that has been notified in the joint transmission 840 to notify the multi AP of a reception response and the residual CFO of the access point into which the pilot signal has been inserted. The frame includes "frame control", "length", "source address", "residual CFO feedback", and "FCS", but the components are not limited thereto.

The "frame control" includes information indicating that this frame is a frame to be notified as the Ack 860. The "length" includes information indicating the length of the frame. The "source address" (RA) includes information indicating the wireless terminal 201 as a source. The "residual CFO feedback" includes information indicating the residual CFO for any access point constituting the multi AP. The "FCS" (Frame Check Sequence) includes a sequence necessary for performing error detection or error correction on the received frame.

The "residual CFO feedback" includes one or more subfields of the "multi AP number" and "residual CFO AP #i".

The "multi AP number" includes information indicating the number of access points indicating residual CFO referred to in the "residual CFO feedback". The "residual CFO AP #i" (Residual CFO AP #i) includes information indicating the residual CFO of each access point. Here, i is an integer from 1 to $M_{AP}$. For example, information including $M_{AP}$ as the "multi AP number" is included, and the "residual CFO AP #i" includes a value indicating the residual CFO between the BSSID of the access point constituting the multi AP and the access point with respect to the wireless terminal 201.

As described above, according to the embodiment of the present technology, by transmitting the information indicating the allocation of the pilot signal of the multi AP in the joint transmission 840, the phase tracking 850 can be performed in the wireless terminal 201 that has received the information. Furthermore, the frequency error compensation 870 can be performed in the multi AP by notifying the residual CFO generated in the wireless terminal 201 together with the Ack 860.

2. Modification Example

[Modification Example of Pilot Allocation Negotiation]

In the above-described embodiment, in the pilot allocation negotiation 820, the allocation of the pilot signal of the access point is individually indicated by using the "allocation type" of the "pilot allocation". On the other hand, in this modification example, a rule for determining the allocation of the pilot signal according to the magnitude of the MAC address is assumed. This eliminates the need for explicit indication using the "allocation type".

Figure 8:
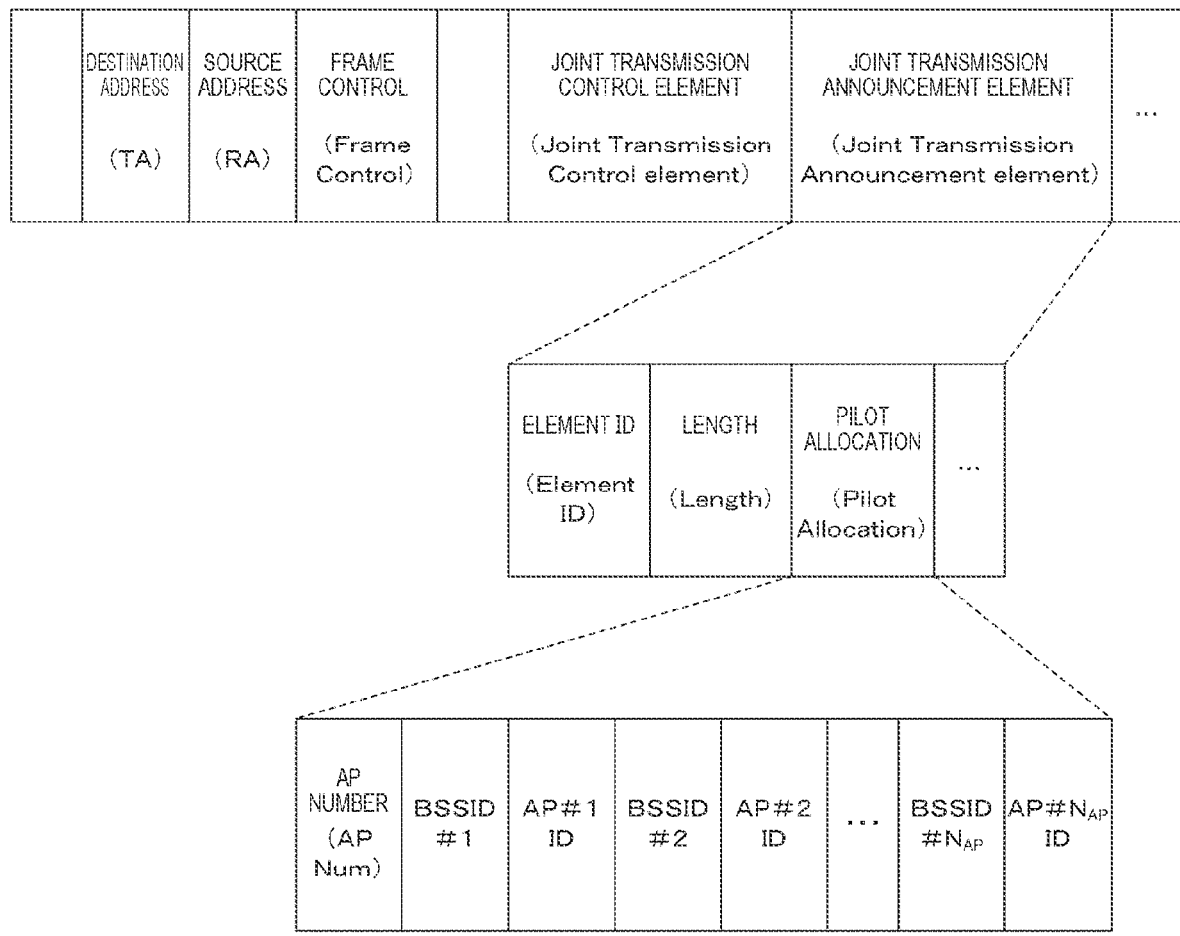
FIG. 8 is a diagram illustrating a modification example of a frame configuration to be notified in the pilot allocation negotiation 820 in the embodiment of the present technology.

FIG. 8 is a diagram illustrating a modification example of the frame configuration to be notified in the pilot allocation negotiation 820 in the embodiment of the present technology.

Here, the "joint transmission announcement element" which is a difference from the pilot allocation negotiation 820 according to the above-described embodiment will be described. The "joint transmission announcement element" in this modification example includes at least one of the "element ID", the "length", or the "pilot allocation", but the components are not limited thereto.

The "element ID" includes information indicating that this element is the "joint transmission announcement element". The "length" includes information indicating a length of this element. The "pilot allocation" includes information regarding the allocation of the pilot signal to an arbitrary access point constituting the multi AP.

The "pilot allocation" includes one or more subfields of "AP number", "BSSID #i", and "AP #iID".

The "AP number" (AP Num) includes information indicating the number of access points targeted by the pilot allocation. The "BSSID #i" includes information indicating an identification number of an access point. The "AP #iID" includes information regarding the allocation of the pilot signal to the access point indicated by each "BSSID #i". Here, i is an integer from 1 to $N_{AP}$. For example, the "AP number" includes information indicating $N_{AP}$, the "BSSID #i" includes information indicating a value determined by the MAC address, and the "AP #iID" includes information indicating a natural number equal to or less than $N_{AP}$.

In this modification example, it is assumed that the access point indicated by the "BSSID #i" determines the pilot allocation with reference to the information indicated by the "AP #iID" and the codebook of the pilot allocation determined among the multi AP in advance.

[Modification Example of Joint Transmission]

Figure 9:
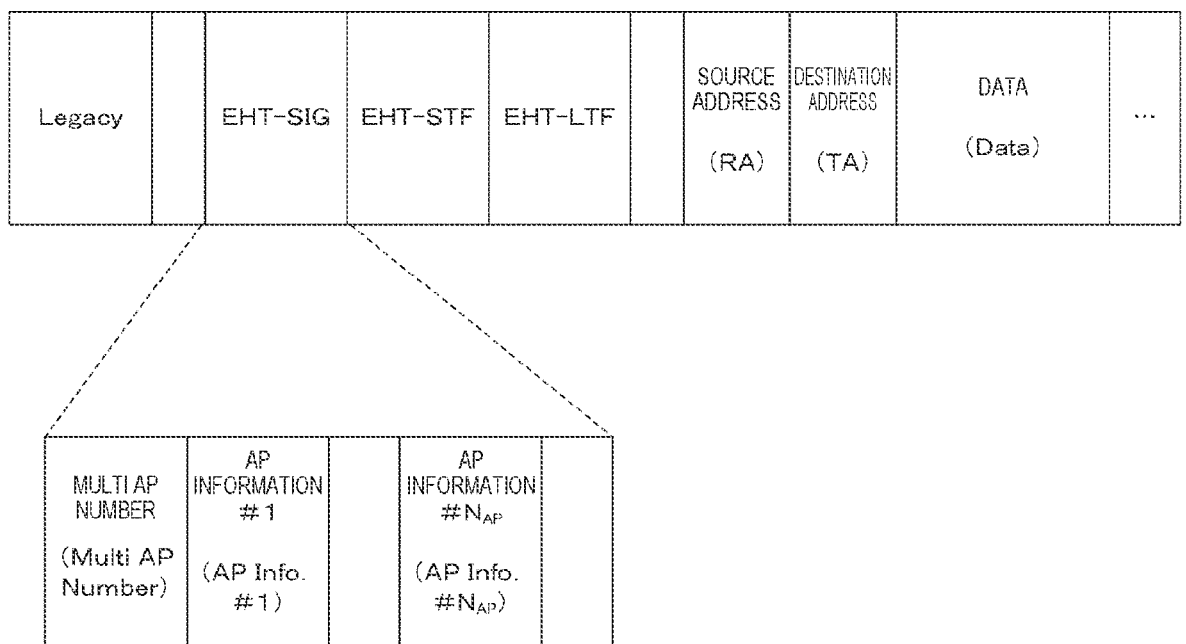
FIG. 9 is a diagram illustrating a modification example of a data unit configuration notified in the joint transmission 840 in the embodiment of the present technology.

FIG. 9 is a diagram illustrating a modification example of a data unit configuration notified in the joint transmission 840 in the embodiment of the present technology.

In the above-described embodiment, the information of the "allocation type" is indicated for each channel, but in this modification example, the information regarding the allocation of the pilot signal is indicated for each access point.

Here, the "EHT-SIG" which is a difference from the joint transmission 840 according to the above-described embodiment will be described. The "EHT-SIG" in this modification example includes at least one of the "multi AP number" or the "AP information #i", but the components are not limited thereto.

The "multi AP number" includes information indicating the number ($N_{AP}$) of subsequent "AP information #i" subfields. The "AP information #i" (AP Info #i) includes information regarding the allocation of the pilot signal for each access point constituting the multi AP. Here, i is an integer from 1 to $N_{AP}$.

Hereinafter, as a specific example, a case where a "data" portion in a data unit according to a modification example of the joint transmission 840 is transmitted by the OFDM modulation method will be described.

Figure 10:
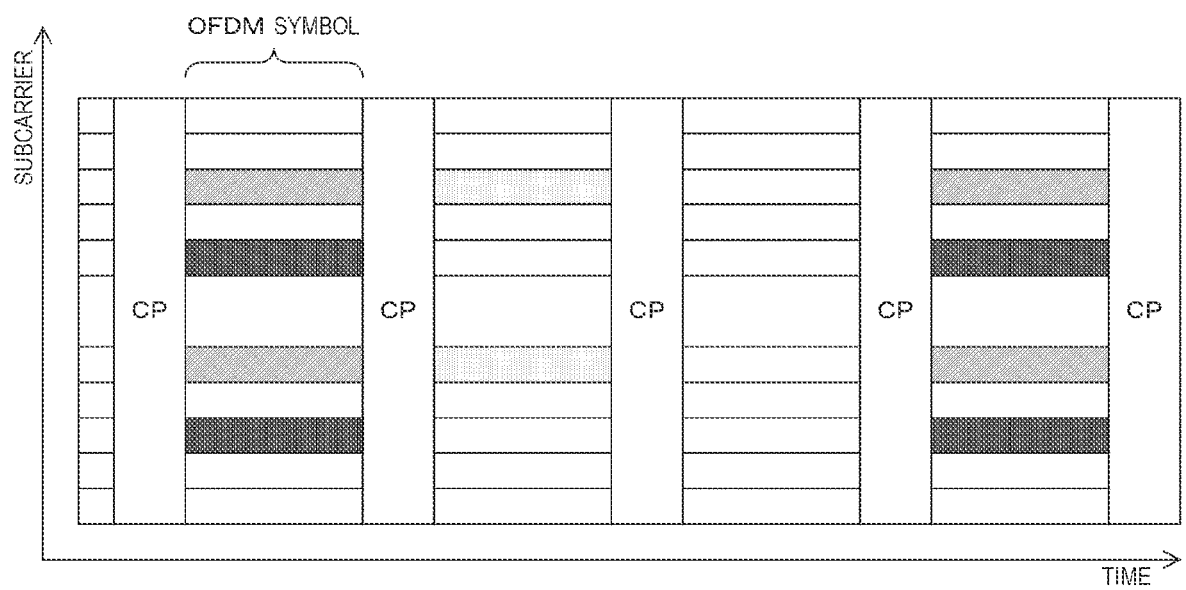
FIG. 10 is a diagram illustrating an example of allocation of a pilot signal in the embodiment of the present technology.
Figure 10:
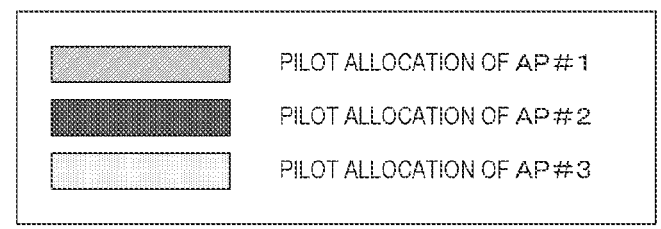

FIG. 10 is a diagram illustrating an example of the allocation of the pilot signal in the embodiment of the present technology. The diagram illustrates a plurality of OFDM symbols constituting the "data" part.

The wireless terminal 201 cuts out each OFDM symbol and demodulates the symbol inserted into each subcarrier by frequency conversion. At this time, a cyclic prefix (CP) is inserted at the head such that all delayed waves observed in the OFDM symbol become delayed waves by symbols used in the same OFDM symbol. In the CP, a time domain waveform at an arbitrary end of the immediately following OFDM symbol may be used, but the present invention is not limited thereto.

In the drawing, it is assumed that three access points (AP #1, AP #2 and AP #3) constitute the multi AP. The pilot signal is inserted into each OFDM symbol, but it is performed so that the pilot signal is inserted into subcarriers and OFDM symbols different from each other among access points. However, not all access point pilot signals need to be inserted in all the OFDM symbols.

In a case where the information indicating the AP #1, the AP #2, and the AP #3 is included in the "AP information #1" to the "AP information #3", and the information indicating "3", which is the number of access points constituting the multi AP, is included in the "multi AP number", it is assumed that the pilot allocation method is known between the multi AP and the wireless terminal 201 using these pieces of information.

In this case, the wireless terminal 201 can estimate where the access point constituting the multi AP inserts the pilot signal according to information indicated by the "multi AP number" and the "AP information #1" to the "AP information #3" in the "EHT-SIG". Then, the wireless terminal 201 can thus estimate the residual CFO of each access point.

Note that, in the above-described embodiment, the wireless terminal 201 can estimate where the access point constituting the multi AP inserts the pilot signal according to information indicated in the "allocation type" of each "channel #i" in the "EHT-SIG," and can estimate the residual CFO of each access point.

Note that the embodiments described above illustrate an example for embodying the present technology, and matters in the embodiments and matters specifying the invention in the claims have respective correspondence relationships. Similarly, the matters specifying the invention in the claims and matters having the same names in the embodiments of the present technology have respective correspondence relationships. However, the present technology is not limited to the embodiments and can be embodied by making various modifications to the embodiments without departing from the gist thereof.

Further, the processing procedures described in the embodiment described above may be regarded as a method having a series of these procedures, and may be furthermore regarded as a program for causing a computer to execute these series of procedures or a recording medium for storing the program. As this recording medium, for example, a Compact Disc (CD), a MiniDisc (MD), a Digital Versatile Disc (DVD), a memory card, a Blu-ray disc (Blu-ray (registered trademark) Disc), or the like can be used.

Note that effects described in the present description are merely examples and are not limited, and other effects may be provided.

Note that the present technology can have configurations as follows.

(1) A wireless base station including:
a wireless control unit that generates a reference signal agreed with a coordinated wireless base station that performs coordinated transmission; and
a communication unit that transmits a signal including the reference signal to a wireless terminal in coordination with the coordinated wireless base station.

(2) The wireless base station according to (1) above, in which
the reference signal is transmitted using at least one of a different frequency, a different time, or a different sequence.

(3) The wireless base station according to (1) or (2) above, in which
the communication unit exchanges information regarding a coordination method that is applicable prior to the coordinated transmission between the coordinated wireless base station and the wireless terminal.

(4) The wireless base station according to any one of (1) to (3) above, in which
the wireless control unit agrees on allocation of the reference signal in the coordinated transmission with the coordinated wireless base station prior to the generation of the reference signal.

(5) The wireless base station according to (4) above, in which
the reference signal allocation agreement unit agrees on information for each frequency channel in a frequency band used in the coordination method and information regarding the frequency channel.

(6) The wireless base station according to (4) or (5) above, in which
the wireless control unit agrees on at least one of information regarding a number of the coordinated wireless base stations, information for identifying the coordinated wireless base stations, or information including a number allocated to the coordinated wireless base stations.

(7) The wireless base station according to any one of (4) to (6) above, in which
for each of the coordinated wireless base stations, the wireless control unit agrees on information indicating presence or absence of insertion of the reference signal, information indicating a symbol into which the reference signal is inserted, and information including at least one of a sequence for separating the reference signal by the wireless terminal.

(8) The wireless base station according to any one of (1) to (7) above, in which
the communication unit transmits information regarding the coordinated wireless base station to the wireless terminal in the coordinated transmission.

(9) The wireless base station according to (8) above, in which
the communication unit transmits information of every arbitrary frequency channel used in the coordinated transmission to the wireless terminal as the information regarding the coordinated wireless base station.

(10) The wireless base station according to (8) or (9) above, in which
the communication unit transmits an identification number to be allocated to the coordinated wireless base station to the wireless terminal as the information regarding the coordinated wireless base station.

(11) The wireless base station according to any one of (8) to (10) above, in which
the information regarding the coordinated wireless base station is information for determining allocation of the reference signal by combining with a codebook determined with the coordinated wireless base station.

(12) The wireless base station according to any one of (1) to (11) above, further including
a signal processing unit that compensates for a frequency error on the basis of information regarding frequency synchronization notified from the wireless terminal in the coordinated transmission.

(13) A wireless base station including:
a wireless control unit that receives reference information from a coordinated wireless base station that performs coordinated transmission; and
a communication unit that transmits a signal including the reference information to the wireless terminal in coordination with the coordinated wireless base station.

(14) The wireless base station according to (13) above, in which
the communication unit transmits information regarding the coordinated wireless base station to the wireless terminal in the coordinated transmission.

(15) The wireless base station according to (14) above, in which
the communication unit transmits information of every arbitrary frequency channel used in the coordinated transmission to the wireless terminal as the information regarding the coordinated wireless base station.

(16) The wireless base station according to (14) or (15) above, in which
the communication unit transmits an identification number to be allocated to the coordinated wireless base station to the wireless terminal as the information regarding the coordinated wireless base station.

(17) The wireless base station according to any one of (14) to (16) above, in which
the information regarding the coordinated wireless base station is information for determining allocation of the reference signal by combining with a codebook determined with the coordinated wireless base station.

(18) The wireless base station according to any one of (13) to (17) above, further including
a signal processing unit that compensates for a frequency error on the basis of information regarding frequency synchronization notified from the wireless terminal in the coordinated transmission.

(19) A wireless terminal including:
a channel estimation unit that separates a reference signal from signals transmitted in coordination from a plurality of wireless base stations on the basis of reference information and estimates a frequency error among the plurality of wireless base stations; and
a signal processing unit that performs phase shift compensation on the signals transmitted in coordination on the basis of the estimated frequency error.

(20) The wireless terminal according to (19) above, in which
the channel estimation unit separates the reference signal on the basis of a codebook determined among the plurality of wireless base stations and the information.

(21) The wireless terminal according to (19) or (20) above, further including
a communication unit that transmits information regarding the estimated frequency error to at least one of the plurality of wireless base stations.

REFERENCE SIGNS LIST

11, 12 Access point
101 Master access point
102 Slave access point
201 Wireless terminal
300 Wireless communication device
310 Communication unit
311 Wireless control unit
312 Data processing unit
313 Modulation-demodulation unit
314 Signal processing unit
315 Channel estimation unit
316 Wireless interface unit
317 Amplifier unit
319 Antenna
321 Control unit
322 Power supply unit
810 Capability exchange
820 Pilot allocation negotiation
830 Pilot allocation
840 Joint transmission
850 Phase tracking
860 Ack
870 Frequency error compensation

The invention claimed is:

1. A first coordinated wireless base station, comprising:
a communication unit configured to exchange first information with a second coordinated wireless base station of a plurality of coordinated wireless base stations, wherein
the plurality of coordinated wireless base stations includes the first coordinated wireless base station,
each coordinated wireless base station of the plurality of coordinated wireless base stations performs coordinated transmission, and
the first information is for allocation of a reference signal;
a wireless control unit configured to generate the reference signal based on the first information, wherein
the communication unit is further configured to:
transmit a signal including the reference signal to a wireless terminal in the coordinated transmission; and
receive second information from the wireless terminal based on the transmitted signal, and
the second information includes:
third information indicating a frequency error associated with the plurality of coordinated wireless base stations, and
fourth information indicating a number of coordinated wireless base stations in the plurality of coordinated wireless base stations; and
a signal processing unit configured to correct the frequency error based on the second information.

2. The first coordinated wireless base station according to claim 1, wherein each coordinated wireless base station of the plurality of coordinated wireless base stations further transmits the reference signal using at least one of a different frequency, a different time, or a different sequence.

3. The first coordinated wireless base station according to claim 1, wherein the communication unit is further configured to exchange, with the second coordinated wireless base station and the wireless terminal, fifth information regarding a coordination method prior to the coordinated transmission.

4. The first coordinated wireless base station according to claim 3, wherein the first information includes:
sixth information regarding each frequency channel of a plurality of frequency channels in a frequency band used in the coordination method, and
seventh information regarding the reference signal.

5. The first coordinated wireless base station according to claim 1, wherein the first information includes at least one of:
fifth information for identification of the plurality of coordinated wireless base stations, or
sixth information including a number allocated to each coordinated wireless base station of the plurality of coordinated wireless base stations.

6. The first coordinated wireless base station according to claim 1, wherein the first information includes:
fifth information indicating a presence or an absence of insertion of the reference signal,
sixth information indicating a symbol into which the reference signal is inserted, and
seventh information including a sequence for separation of separating the reference signal by the wireless terminal.

7. The first coordinated wireless base station according to claim 1, wherein the communication unit is further configured to transmit fifth information regarding the second coordinated wireless base station to the wireless terminal in the coordinated transmission.

8. The first coordinated wireless base station according to claim 7, wherein the fifth information includes sixth information regarding each arbitrary frequency channel of a plurality of arbitrary frequency channels used in the coordinated transmission.

9. The first coordinated wireless base station according to claim 7, wherein the fifth information includes sixth information indicating an identification number to be allocated to the second coordinated wireless base station.

10. The first coordinated wireless base station according to claim 7, wherein
the fifth information includes the first information, and
the allocation of the reference signal is based on a codebook determined by the second coordinated wireless base station.

11. A first coordinated wireless base station, comprising:
a wireless control unit configured to receive reference information from a second coordinated wireless base station of a plurality of coordinated wireless base stations, wherein
the plurality of coordinated wireless base stations includes the first coordinated wireless base station, and
each coordinated wireless base station of the plurality of coordinated wireless base stations performs coordinated transmission;
a communication unit configured to:
transmit a signal including the reference information to a wireless terminal in the coordinated transmission; and
receive first information from the wireless terminal based on the transmitted signal,
wherein the first information includes:
second information indicating a frequency error associated with the plurality of coordinated wireless base stations, and
third information indicating a number of coordinated wireless base stations in the plurality of coordinated wireless base stations; and
a signal processing unit configured to correct the frequency error based on the first information.

12. The first coordinated wireless base station according to claim 11, wherein the communication unit is further configured to transmit fourth information regarding the second coordinated wireless base station to the wireless terminal in the coordinated transmission.

13. The first coordinated wireless base station according to claim 12, wherein the fourth information includes fifth information regarding each arbitrary frequency channel of a plurality of arbitrary frequency channels used in the coordinated transmission.

14. The first coordinated wireless base station according to claim 12, wherein the fourth information includes fifth information indicating an identification number to be allocated to the second coordinated wireless base station.

15. The first coordinated wireless base station according to claim 12, wherein
the fourth information is information for allocation of a reference signal, and
the allocation of the reference signal is based on a codebook determined by the second coordinated wireless base station.

16. A wireless terminal, comprising:
a channel estimation unit configured to:
separate, based on reference information, a reference signal from signals transmitted in coordination from a plurality of coordinated wireless base stations; and
estimate, based on the reference signal, a frequency error associated with the plurality of coordinated wireless base stations;
a signal processing unit configured to perform phase shift compensation on the signals based on the estimated frequency error; and
a communication unit configured to transmit first information to at least one coordinated wireless base station of the plurality of coordinated wireless base stations for correction of the estimated frequency error,
wherein the first information includes:
second information indicating the estimated frequency error, and
third information indicating a number of coordinated wireless base stations in the plurality of coordinated wireless base stations.

17. The wireless terminal according to claim 16, wherein the channel estimation unit is further configured to separate the reference signal based on a codebook determined by the plurality of coordinated wireless base stations.

* * * * *